(12) United States Patent
Frasch et al.

(10) Patent No.: US 6,923,474 B2
(45) Date of Patent: Aug. 2, 2005

(54) AXLE SUPPORT FOR A FRONT AXLE OF A MOTOR VEHICLE

(75) Inventors: Wilhelm Frasch, Oberboihingen (DE); Herbert Klamser, Grafenau (DE); Sven Rau, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 257 days.

(21) Appl. No.: 10/437,460

(22) Filed: May 14, 2003

(65) Prior Publication Data
US 2004/0021285 A1 Feb. 5, 2004

(30) Foreign Application Priority Data
May 14, 2002 (DE) .......................... 102 21 299

(51) Int. Cl.[7] .................. B62D 7/22; B62D 21/11; B62D 21/00; B60G 21/055
(52) U.S. Cl. ...................... 280/784; 280/124.107; 280/124.109; 180/312

(58) Field of Search .................. 280/124.107, 124.109, 280/784, 788; 180/312, 232

(56) References Cited

FOREIGN PATENT DOCUMENTS

| DE | 4313785 A1 | 11/1994 |
|----|------------|---------|
| DE | 199 20 051 | 11/2000 |
| EP | 0958992 A2 | 11/1999 |
| FR | 2810275 A  | 12/2001 |

OTHER PUBLICATIONS

European Search Report mailed Feb. 5, 2004.

*Primary Examiner*—Paul N. Dickson
*Assistant Examiner*—Joselynn Y. Sliteris
(74) *Attorney, Agent, or Firm*—Crowell & Moring LLP

(57) ABSTRACT

An axle support for a front axle of a motor vehicle, a stabilizer is disposed on the front side which can be fixed by holding elements. Each holding element is constructed for fastening the stabilizer and is simultaneously used as a so-called crash support which has a protective and energy-absorbing effect in the event of an impact.

27 Claims, 1 Drawing Sheet

AXLE SUPPORT FOR A FRONT AXLE OF A MOTOR VEHICLE

BACKGROUND AND SUMMARY OF THE INVENTION

This application claims the priority of German Application No. 102 21 299.6 filed May 14, 2002, the disclosure of which is expressly incorporated by reference herein.

The invention relates to an axle support for a front axle of a motor vehicle, which comprises side members connected by way of cross members, which can be connected by means of bearings with the vehicle body, and bearing receiving devices for suspension links are provided on the members, and on the front side of the axle support-viewed in the driving direction of the motor vehicle-a stabilizer is disposed on the cross member and can be fastened by way of holding elements.

From German Patent Document DE 199 20 051 A1, an axle support for a front axle of a motor vehicle is known which has side members extending in the longitudinal direction of the vehicle and, together with two cross members, form a frame which can be connected with the vehicle body by means of elastic bearings. A stabilizer is fastened to the forward cross member by means of clamps.

It is an object of the invention to provide an axle support for a motor vehicle with a fastening for a stabilizer, which fastening is also constructed for protecting the axle support in the event of a crash.

According to the invention, this object is achieved by an axle support for a front axle of a motor vehicle, which comprises side members connected by way of cross members, which can be connected by means of bearings with the vehicle body, and bearing receiving devices for suspension links are provided on the members, and on the front side of the axle support-viewed in the driving direction of the motor vehicle-a stabilizer is disposed on the cross member and can be fastened by way of holding elements, wherein each holding element, on the one hand, reaches over the stabilizer while holding it as a clamp and can be fastened to a cross member or to a side member extension of the axle support by way of fastening screws and, on the other hand, the holding element comprises an impact part which projects beyond the respective member of the axle support and which, together with the respective member of the axle support forms a front-side hook-type connection and, at a rearward free end forms a supporting device with respect of the respective member of the axle support.

Important advantages achieved by means of the invention consist of the fact that holding elements are used for the stabilizer which simultaneously, in the event of a crash or an impact on the axle support, protect the latter at least to such an extent that a significant displacement of the axle support in its bearings is avoided. This also suppresses damage to the axle support. For this purpose, the holding element is used as a so-called clamp for the stabilizer which reaches over the latter and holds it and is fastened to the member or to a member extension by means of fastening screws and, on the other hand, the holding element has an impact part which projects beyond the member or the member extension of the axle support and which, together with the member or a member part, forms a front-side hook connection and a rear-side supporting device with respect to the member. This hook connection consists essentially of a slot-type recess in the holding element into which a forward edge of the member projects. As a result of such a construction of the holding element and its arrangement with respect to the member, it is advantageously achieved that, during an impact onto the axle support against the driving direction, this impact is first absorbed by the holding element or by the two holding elements. These hook in at the front edge of the member and can deform in an energy-absorbing manner, in which case, by way of the rearward supporting device, a significant displacement of the holding elements is counteracted. In the vehicle, the holding elements are covered by a front-end apron or the like.

The energy-absorbing deformation is also improved in that, in front of the hook-type connection—viewed in the driving direction—an area of the holding element situated in front of the member is provided which has a supporting edge.

The hook-type connection also prevents a tearing-off of the fastening screws in the event of a possible pressing-up of the holding element.

In particular, a supporting device with respect to the member is arranged at the free rearward end of the holding element, which supporting device consists of an inclined plane interacting with a corresponding inclined plane at the member. In the event of an impact upon the impact edge of the holding element, this supporting device by way of inclined surfaces promotes a certain play in the relatively movement with respect to the member or to the axle support. In addition, the edge of this supporting device can dig itself into the axle support.

For absorbing energy, the holding elements preferably have several recesses which may have a triangular or other construction and directly follow one another.

An embodiment of the invention is illustrated in the drawings and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
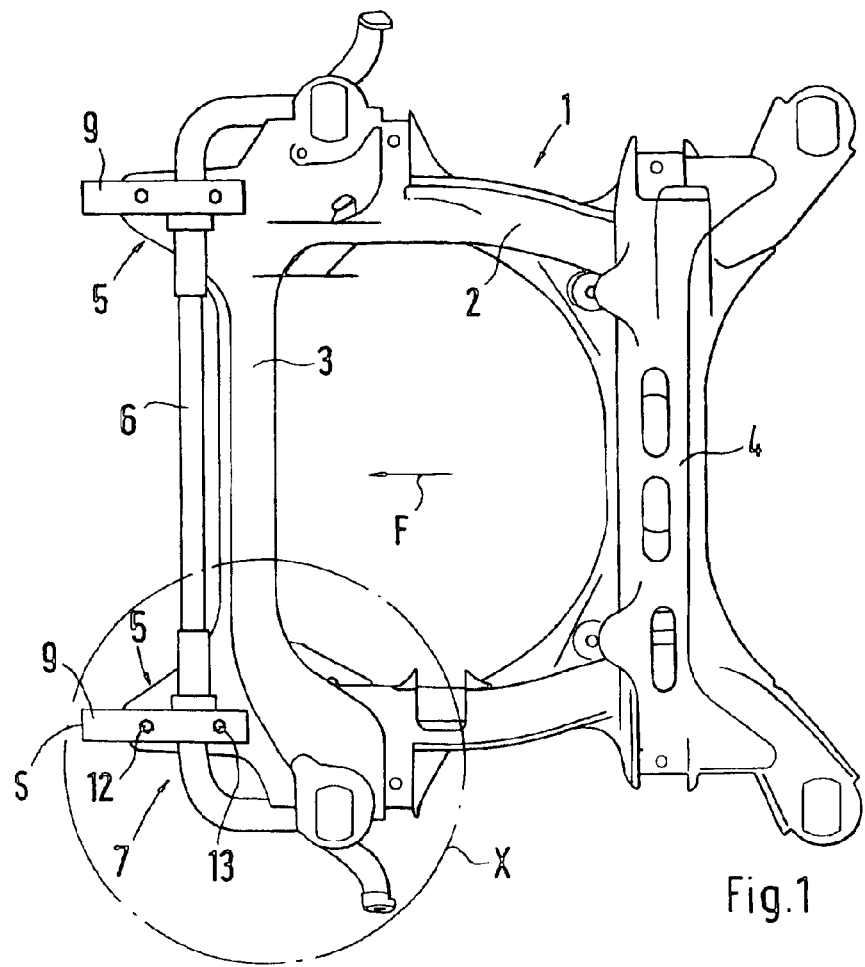
FIG. 1 is a top view of an axle support with a stabilizer which can be fastened by means of holding elements, constructed according to a preferred embodiment of the present invention.
Figure 2:
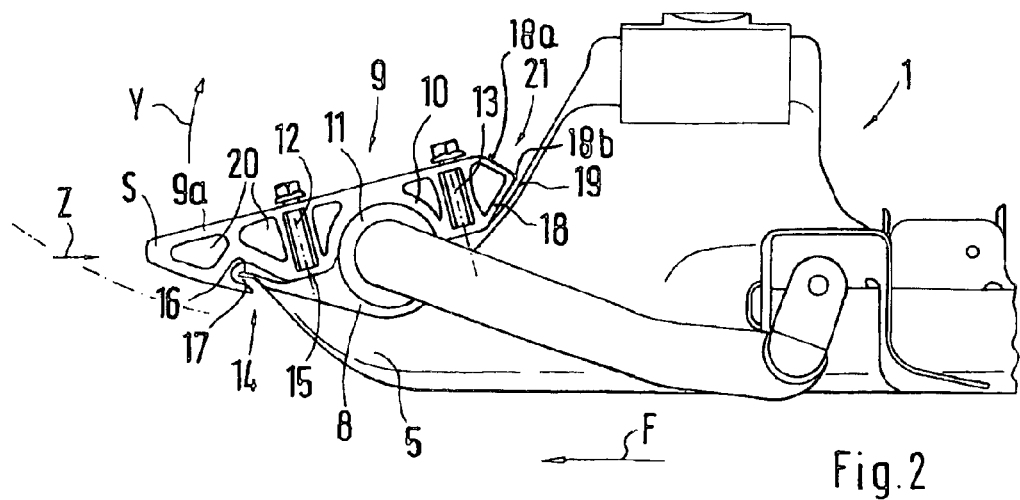
FIG. 2 is a lateral view of a holding element shown in an enlarged manner according to the cutout X of FIG. 1.

An axle support 1 essentially comprises side members 2 and cross members 3 and 4 connected to form a frame. On the forward member 3, a stabilizer 6 is held in bearings 7 and fastened to a member extension 5.

In member extensions 5, the bearing 7 in each case comprises a semicircular bearing 8 and the supplementary additional semicircular bearing 10 in a holding element 9 constructed as a clamp. The crossbar of the stabilizer 6 is surrounded by a bearing element 11.

The holding element 9 reaches from above over the crossbar of the stabilizer and is connected with the member extension 5 by means of fastening screws 12, 13.

Simultaneously, the holding element 9 with its impact part 9a forms a so-called crash support which acts in the event of an impact in the direction of the arrow Z upon the axle support 1 against the driving direction F and has the purpose of absorbing the latter. For this purpose, the holding element 9 is provided with a so-called hook-type connection 14 which consists essentially of a slot-type recess 17 in the bearing surface 15 into which a member front edge 16 of the member extension 5 projects in an open manner.

For supporting the holding element 9 by means of its rearward free end 21, the latter has an inclined supporting surfaces 18, 18a forming an edge 18b which is situated opposite a corresponding supporting surface 19 at the member 3. In the event of a crash, the edge of the supporting surface will dig into the axle support.

The holding element 9 preferably consists of an extruded profile with several openings 20 which follow one another. The openings have triangular constructions but many also have another geometrical shape.

In the event of an impact upon the holding element 9 or upon the supporting edge S of the impact part 9a in the direction of the arrow Z, the latter hooks by way of its slot 17 into the front edge 16 of the member extension 5, and a limited energy absorption can take place by way of the holding element 9. As a result of the impact, the holding element 9 is supported on the back side at its free end 21 by way of the supporting surface 18 on the member 3. By way of the hook-type connection 14, it is also ensured that the holding element 9 cannot move upward in the direction of the arrow Y and the screws 12, 13 are therefore not torn out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Axle support for a front axle of a motor vehicle, which comprises side members connected by way of cross members, which can be connected by means of bearings with the vehicle body, and bearing receiving devices for suspension links are provided on the members, and on the front side of the axle support—viewed in the driving direction of the motor vehicle—a stabilizer is disposed on the cross member and can be fastened by way of holding elements, wherein each holding element, on the one hand, reaches over the stabilizer while holding it as a clamp and can be fastened to a cross member or to a side member extension of the axle support by way of fastening screws and, on the other hand, the holding element comprises an impact part which projects beyond the respective member of the axle support and which, together with the respective member of the axle support, forms a front-side-hook connection and, at a rearward free end forms a supporting device with respect to the respective member of the axle support.

2. Axle support according to claim 1, wherein the holding element has a slot recess in its bearing surface with respect to the respective member of the axle support as a hook connection, into which recess a front edge of the respective member of the axle support projects.

3. Axle support according to claim 1, wherein, in front of the hook connection—viewed in the driving direction F—the impact part of the holding element situated in front of the respective member of the axle support is provided with a supporting edge.

4. Axle support according to claim 2, wherein, in front of the hook connection—viewed in the driving direction F—the impact part of the holding element situated in front of the respective member of the axle support is provided with a supporting edge.

5. Axle support according to claim 1, wherein at the free rearward end of the holding element, the supporting device with respect to the respective member of the axle support is arranged which consists of an inclined surface which is situated opposite a corresponding inclined surface at the member.

6. Axle support according to claim 2, wherein at the free rearward end of the holding element, the supporting device with respect to the respective member of the axle support is arranged which consists of an inclined surface which is situated opposite a corresponding inclined surface at the member.

7. Axle support according to claim 3, wherein at the free rearward end of the holding element, the supporting device with respect to the respective member of the axle support is arranged which consists of an inclined surface which is situated opposite a corresponding inclined surface at the member.

8. Axle support according to claim 4, wherein at the free rearward end of the holding element, the supporting device with respect to the respective member of the axle support is arranged which consists of an inclined surface which is situated opposite a corresponding inclined surface at the member.

9. Axle support according to claim 5, wherein the inclined surface in a transition to another inclined surface, forms an edge, which is situated directly opposite a metal plate of the respective member of the axle support.

10. Axle support according to claim 6, wherein the inclined surface in a transition to another inclined surface, forms an edge, which is situated directly opposite a metal plate of the respective member of the axle support.

11. Axle support according to claim 7, wherein the inclined surface in a transition to another inclined surface, forms an edge, which is situated directly opposite a metal plate of the respective member of the axle support.

12. Axle support according to claim 8, wherein the inclined surface in a transition to another inclined surface, forms an edge, which is situated directly opposite a metal plate of the respective member of the axle support.

13. Axle support according to claim 1, wherein the holding element consists of an extruded profile with several recesses, the fastening screws being received in molded-in sleeves between these recesses.

14. Axle support according to claim 2, wherein the holding element consists of an extruded profile with several recesses, the fastening screws being received in molded-in sleeves between these recesses.

15. Axle support according to claim 3, wherein the holding element consists of an extruded profile with several recesses, the fastening screws being received in molded-in sleeves between these recesses.

16. Axle support according to claim 5, wherein the holding element consists of an extruded profile with several recesses, the fastening screws being received in molded-in sleeves between these recesses.

17. Axle support according to claim 9, wherein the holding element consists of an extruded profile with several recesses, the fastening screws being received in molded-in sleeves between these recesses.

18. Axle support according to claim 13, wherein the recesses have a triangular construction and directly follow one another in an in use travel direction of the vehicle.

19. Axle support according to claim 14, wherein the recesses have a triangular construction and directly follow one another in an in use travel direction of the vehicle.

20. Axle support according to claim 15, wherein the recesses have a triangular construction and directly follow one another in an in use travel direction of the vehicle.

21. Axle support according to claim 16, wherein the recesses have a triangular construction and directly follow one another in an in use travel direction of the vehicle.

22. Axle support according to claim 17, wherein the recesses have a triangular construction and directly follow one another in an in use travel direction of the vehicle.

23. Axle support assembly for a vehicle axle comprising:
   side members and a cross member connected to the side members,
   a stabilizer disposed at an in use vehicle end side on said cross member, and
   at least one holding element assembly operable to hold the stabilizer at the cross member, said holding element assembly including a clamping member and clamping screws engageable with the clamping member to clampingly hold the clamping member against a side of the stabilizer,
   wherein said clamping member includes an impact part which projects away from the stabilizer toward a vehicle end side and has a lower hook section engageable in a hook section of a respective one of the side members and cross member, and
   wherein said clamping member includes an inner end part opposite the impact part and supported at the respective one of the side members and cross members.

24. Axle support according to claim 23, wherein said clamping member is supported at the cross member by the clamping screws, said impact part lower hook section being in the form of a recess into which part of the cross member protrudes.

25. Axle support according to claim 24, wherein said cross member and stabilizer are disposed at a front section of a vehicle.

26. Axle support according to claim 23, wherein said clamping member includes laterally extending recesses for accommodating deformation in the event of an impact.

27. A clamping assembly for clamping a vehicle stabilizer to a vehicle axle support cross member, comprising:
   a clamping member having a recess clampingly engageable with the stabilizer, and threaded fastening members extendible through openings in said clamping member at opposite sides of the recess for threadably fastening the clamping member to the cross member,
   wherein the clamping member includes an impact section at one end for absorbing vehicle collision impact forces, said impact section including a hook section engageable over a part of the cross member, and
   wherein the clamping member includes a supporting abutment surface at an end opposite the impact section which in use abuts a support surface at the cross member.

\* \* \* \* \*